United States Patent
Cai et al.

(10) Patent No.: US 12,445,927 B2
(45) Date of Patent: Oct. 14, 2025

(54) CONTROL METHOD FOR SHARING MODE OF BASE STATION, SHARED BASE STATION, AND COMMUNICATION SYSTEM

(71) Applicant: CHINA TELECOM CORPORATION LIMITED, Beijing (CN)

(72) Inventors: Bowen Cai, Beijing (CN); Weiliang Xie, Beijing (CN); Hua Zhang, Beijing (CN); Han Guo, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 330 days.

(21) Appl. No.: 18/021,976

(22) PCT Filed: May 10, 2021

(86) PCT No.: PCT/CN2021/092783
§ 371 (c)(1),
(2) Date: Feb. 17, 2023

(87) PCT Pub. No.: WO2022/037134
PCT Pub. Date: Feb. 24, 2022

(65) Prior Publication Data
US 2024/0015627 A1  Jan. 11, 2024

(30) Foreign Application Priority Data

Aug. 18, 2020 (CN) .......................... 202010832014.5

(51) Int. Cl.
*H04W 36/22* (2009.01)
*H04W 36/06* (2009.01)
*H04W 84/04* (2009.01)

(52) U.S. Cl.
CPC ........... *H04W 36/22* (2013.01); *H04W 36/06* (2013.01); *H04W 84/042* (2013.01)

(58) Field of Classification Search
CPC ... H04W 16/14; H04W 24/02; H04W 28/082; H04W 28/0846; H04W 28/0908;
(Continued)

(56) References Cited

U.S. PATENT DOCUMENTS

| 2007/0183353 A1* | 8/2007 | Malladi ................. H04W 72/52 370/312 |
| 2012/0014332 A1* | 1/2012 | Smith ................... H04W 72/04 370/329 |

(Continued)

FOREIGN PATENT DOCUMENTS

| CN | 103548389 A | 1/2014 |
| CN | 105247922 A | 1/2016 |

(Continued)

OTHER PUBLICATIONS

International Search Report and Written Opinion issued on Aug. 10, 2021 in corresponding Application No. PCT/CN2021/092783; 9 pages.

(Continued)

*Primary Examiner* — Kashif Siddiqui
(74) *Attorney, Agent, or Firm* — Andrew M. Calderon; Calderon Safran & Wright P.C.

(57) ABSTRACT

This disclosure relates to a control method for a sharing mode of a base station, a shared base station and a communication system. The method of the present disclosure includes: acquiring a load of a standalone carrier of a first operator and a load of a standalone carrier of a second operator within a first preset time; converting one standalone carrier of the standalone carrier of the first operator and the standalone carrier of the second operator to a shared carrier, in a case where a total of the loads of the standalone carrier of the first operator and the standalone carrier of the second operator within the first preset time is less than a first threshold; and switching off another standalone carrier not (Continued)

converted to the shared carrier of the standalone carrier of the first operator and the standalone carrier of the second operator.

20 Claims, 3 Drawing Sheets

(58) Field of Classification Search
CPC . H04W 28/0933; H04W 36/06; H04W 36/22; H04W 52/0206; H04W 72/0453; H04W 72/52; H04W 84/042; H04W 88/10; Y02D 30/70
See application file for complete search history.

(56) References Cited

U.S. PATENT DOCUMENTS

| | | | |
|---|---|---|---|
| 2013/0225183 A1* | 8/2013 | Meshkati | H04W 52/143 455/448 |
| 2014/0148165 A1* | 5/2014 | Serravalle | H04W 16/14 455/436 |
| 2014/0155081 A1 | 6/2014 | Nuss et al. | |
| 2015/0351118 A1 | 12/2015 | Arnott et al. | |
| 2016/0150441 A1 | 5/2016 | Gunnarsson et al. | |
| 2016/0269936 A1 | 9/2016 | Watanabe et al. | |
| 2016/0337817 A1 | 11/2016 | Malladi et al. | |
| 2017/0034706 A1 | 2/2017 | Ericson et al. | |
| 2018/0027419 A1 | 1/2018 | Xu et al. | |
| 2020/0059841 A1* | 2/2020 | Zhang | H04W 36/0085 |

FOREIGN PATENT DOCUMENTS

| | | |
|---|---|---|
| CN | 105794247 A | 7/2016 |
| CN | 106454951 A | 2/2017 |
| CN | 108235339 A | 6/2018 |
| CN | 108616898 A | 10/2018 |
| CN | 111372253 A | 7/2020 |
| EP | 2219408 A2 | 8/2010 |
| EP | 2378702 A2 | 10/2011 |
| WO | 2016154892 A1 | 10/2016 |
| WO | 2017/008852 A1 | 1/2017 |

OTHER PUBLICATIONS

Huawei, "Discussion on RRC re-establishment in case of RAN sharing", 3GPP TSG-RAN WG3 #101bis R3-185739, (Oct. 12, 2018), entire document.

Extended European Search Report issued on Jan. 1, 2024 in corresponding European Application No. 21857235.2; 8 pages.

Notice of grant issued on Nov. 7, 2023 in corresponding Chinese Patent Application No. 202010832014.5; 15 pages.

3GPP TSG-RAN WG2 Meeting #58bis—R2-072682—Orlando, USA, Jun. 25-29, 2007; SRNS relocation for carrier sharing between PS only RNS and PS and CS RNS; Nokia Siemens Networks; 6 pages.

Japanese Office Action dated Apr. 30, 2024 in JP Application No. 2023-512157, with English Translation, 10 pages.

Unknown, "3GPP TSG RAN WG3 Meeting #96", Hangzhou, China, May 15-19, 2017, 3 pages.

* cited by examiner

CONTROL METHOD FOR SHARING MODE OF BASE STATION, SHARED BASE STATION, AND COMMUNICATION SYSTEM

CROSS-REFERENCE TO RELATED APPLICATIONS

The present disclosure is a U.S. National Stage Application under 35 U.S.C. § 371 of International Patent Application No. PCT/CN2021/092783, filed on May 10, 2021, which is based on and claims priority of Chinese application for invention No. 202010832014.5 filed on Aug. 18, 2020, the disclosures of both of which are hereby incorporated into this disclosure by reference in its entirety.

TECHNICAL FIELD

This disclosure relates to the technical field of communication, and in particular, to a control method for a sharing mode of a base station, a shared base station and a communication system.

BACKGROUND

Since 5G works in a high frequency band, there are a great number of base stations, which are expensive and high in power consumption (about three times power consumption of a 4G base station). In order to construct a 5G base station (gNodeB) at low cost and high efficiency, co-construction and sharing of 5G base stations or access networks by a plurality of operators is a necessity. There are two currently proposed solutions for the co-construction and sharing of the access networks by the operators, that is, a shared base station adopts standalone carriers or sharing carriers.

When the shared base station adopts standalone carriers, each carrier is independently configured and managed, and the different carriers which are logically independent are respectively provided to the plurality of operators for independent use, within the shared base station. When the shared base station adopts shared carriers, RAN (Radio Access Network) devices on the shared base station side are all shared, and the different operators share the same carriers.

SUMMARY

According to some embodiments of the present disclosure, there is provided a control method for a sharing mode of a base station, performed by a shared base station, comprising: acquiring a load of a standalone carrier of a first operator and a load of a standalone carrier of a second operator within a first preset time; converting one standalone carrier of the standalone carrier of the first operator and the standalone carrier of the second operator to a shared carrier, in a case where a total of the loads of the standalone carrier of the first operator and the standalone carrier of the second operator within the first preset time is less than a first threshold; and switching off another standalone carrier not converted to the shared carrier of the standalone carrier of the first operator and the standalone carrier of the second operator.

In some embodiments, converting one standalone carrier of the standalone carrier of the first operator and the standalone carrier of the second operator to a shared carrier comprises: converting the standalone carrier of the first operator to the shared carrier, in a case where the load of the standalone carrier of the first operator is greater than that of the standalone carrier of the second operator; and converting the standalone carrier of the second operator to the shared carrier, in a case where the load of the standalone carrier of the first operator is less than that of the standalone carrier of the second operator.

In some embodiments, switching off another standalone carrier not converted to the shared carrier of the standalone carrier of the first operator and the standalone carrier of the second operator comprises: sending a first handover instruction to a terminal, in a case where the another standalone carrier not converted to the shared carrier is accessed by the terminal, wherein the first handover instruction comprises a frequency band corresponding to the shared carrier; and switching off the another standalone carrier not converted to the shared carrier, in a case where the terminal is handed over to the shared carrier.

In some embodiments, the method further comprises: sending information of a terminal of the first operator accessing the shared carrier to a core network of the first operator and sending information of a terminal of the second operator accessing the shared carrier to a core network of the second operator, according to a Public Land Mobile Network (PLMN) identity of each terminal accessing the shared carrier.

In some embodiments, the method further comprises: acquiring a load of the shared carrier within a second preset time; switching on a first standalone carrier, in a case where the load of the shared carrier within the second preset time is greater than a second threshold, wherein the first threshold is less than or equal to the second threshold; and converting the shared carrier to a second standalone carrier, wherein the first standalone carrier and the second standalone carrier are respectively used as standalone carriers of different operators.

In some embodiments, the first standalone carrier is used as the standalone carrier of the second operator and the second standalone carrier is used as the standalone carrier of the first operator, in a case where the load of the first operator is greater than that of the second operator on the shared carrier; and the first standalone carrier is used as the standalone carrier of the first operator and the second standalone carrier is used as the standalone carrier of the second operator, in a case where the load of the first operator is less than that of the second operator on the shared carrier.

In some embodiments, converting the shared carrier to the second standalone carrier comprises: sending a second handover instruction to a terminal of an operator corresponding to the first standalone carrier, in a case where the shared carrier is accessed by the terminal of the operator corresponding to the first standalone carrier, wherein the second handover instruction comprises a frequency band corresponding to the first standalone carrier; and converting the shared carrier to the second standalone carrier, in a case where the terminal of the operator corresponding to the first standalone carrier is handed over to the first standalone carrier.

In some embodiments, the method further comprises: sending information of a terminal accessing the first standalone carrier to a core network of an operator corresponding to the first standalone carrier, and sending information of a terminal accessing the second standalone carrier to a core network of an operator corresponding to the second standalone carrier.

In some embodiments, the load comprises: the load comprises: a number of calls, a throughput, or a number of Radio Resource Control (RRC) connections.

According to some embodiments of the present disclosure, there is provided a shared base station, comprising: an acquisition module configured to acquire a load of a standalone carrier of a first operator and a load of a standalone carrier of a second operator within a first preset time; a carrier converting module configured to convert one standalone carrier of the standalone carrier of the first operator and the standalone carrier of the second operator to a shared carrier, in a case where a total of the loads of the standalone carrier of the first operator and the standalone carrier of the second operator within the first preset time is less than a first threshold; and a carrier switching module configured to switch off another standalone carrier not converted to the shared carrier of the standalone carrier of the first operator and the standalone carrier of the second operator.

In some embodiments, the acquisition module is further configured to acquire a load of the shared carrier within a second preset time; the carrier switching module is further configured to switch on a first standalone carrier, in a case where the load of the shared carrier within the second preset time is greater than a second threshold, wherein the first threshold is less than or equal to the second threshold; and the carrier converting module is further configured to convert the shared carrier to a second standalone carrier, wherein the first standalone carrier and the second standalone carrier are respectively used as standalone carriers of different operators.

In some embodiments, the carrier converting module is configured to convert the standalone carrier of the first operator to the shared carrier, in a case where the load of the standalone carrier of the first operator is greater than that of the standalone carrier of the second operator, and convert the standalone carrier of the second operator to the shared carrier, in a case where the load of the standalone carrier of the first operator is less than that of the standalone carrier of the second operator.

In some embodiments, the shared base station further comprising: a sending module, wherein: the sending module is configured to send a first handover instruction to a terminal, in a case where the standalone carrier not switched to the shared carrier is accessed by the terminal, wherein the first handover instruction comprises a frequency band corresponding to the shared carrier; and the carrier switching module is further configured to switch off the another standalone carrier not converted to the shared carrier, in a case where the terminal is handed over to the shared carrier.

In some embodiments, shared base station further comprising: a sending module configured to send information of a terminal of the first operator accessing the shared carrier to a core network of the first operator and sending information of a terminal of the second operator accessing the shared carrier to a core network of the second operator, according to a Public Land Mobile Network (PLMN) identity of each terminal accessing the shared carrier.

In some embodiments, the first standalone carrier is used as the standalone carrier of the second operator and the second standalone carrier is used as the standalone carrier of the first operator, in a case where the load of the first operator is greater than that of the second operator on the shared carrier, and the first standalone carrier is used as the standalone carrier of the first operator and the second standalone carrier is used as the standalone carrier of the second operator, in a case where the load of the first operator is less than that of the second operator on the shared carrier; the shared base station further comprises: a sending module, wherein the sending module is configured to send a second handover instruction to a terminal of an operator corresponding to the first standalone carrier, in a case where the shared carrier is accessed by the terminal of the operator corresponding to the first standalone carrier, and the carrier converting module is further configured to convert the shared carrier to the second standalone carrier, in a case where the terminal of the operator corresponding to the first standalone carrier is handed over to the first standalone carrier, wherein the second handover instruction comprises a frequency band corresponding to the first standalone carrier; and/or the sending module configured to send information of a terminal accessing the first standalone carrier to a core network of an operator corresponding to the first standalone carrier, and send information of a terminal accessing the second standalone carrier to a core network of an operator corresponding to the second standalone carrier.

According to still other embodiments of the present disclosure, there is provided a shared base station, comprising: a processor; and a memory coupled to the processor for storing instructions which, when executed by the processor, cause the processor to perform the control method for a sharing mode of a base station according to any of the foregoing embodiments.

According to further embodiments of the present disclosure, there is provided a non-transitory computer-readable storage medium having thereon stored a computer program which, when executed by a processor, implements the steps of the method according to any of the foregoing embodiments.

According to still other embodiments of the present disclosure, there is provided a communication system, comprising: the shared base station according to any of the foregoing embodiments; and a terminal configured to receive a first handover instruction sent by the shared base station and handover to the shared carrier according to the first handover instruction, in a case where the terminal accesses the another standalone carrier not converted to the shared carrier, wherein the first handover instruction comprises a frequency band corresponding to the shared carrier.

In some embodiments, the shared base station is further configured to acquire a load of the shared carrier within a second preset time, switch on a first standalone carrier, in a case where the load of the shared carrier within the second preset time is greater than a second threshold, wherein the first threshold is less than or equal to the second threshold and switch the shared carrier to a second standalone carrier, wherein the first standalone carrier and the second standalone carrier are respectively used as standalone carriers of different operators; and the terminal is further configured to receive a second handover instruction sent by the shared base station and handover to the first standalone carrier according to the second handover instruction, in a case that the terminal is a terminal of an operator corresponding to the first standalone carrier, wherein the second handover instruction comprises a frequency band corresponding to the first standalone carrier.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings described herein are used for providing a further understanding of this disclosure and constitute a part of this application. Illustrative embodiments of the present disclosure and the description thereof are configured to explain the present disclosure but do not constitute an improper limitation of the present disclosure.

DETAILED DESCRIPTION

The technical solutions in the embodiments of the present disclosure will be described clearly and completely with reference to the drawings in the embodiments of the present disclosure, and it is obvious that the embodiments described are only some embodiments of the present disclosure, rather than all embodiments. The following description of at least one exemplary embodiment is merely illustrative in nature and is in no way intended to limit this disclosure and its applications or uses. All other embodiments, which can be derived by one of ordinary skill in the art from the embodiments of the present disclosure without making any creative effort, shall fall within the protection scope of the present disclosure.

The inventors have found that: configuring standalone carriers for different operators respectively can support a greater number of connections, but may also cause a greater base station power consumption.

One technical problem to be solved by the present disclosure is: how to enable a shared base station to ensure services for terminals while reduce energy consumption to save resources.

The present disclosure provides a control method for a sharing mode of a base station, which is described below with reference to FIGS. 1 to 2.

Figure 1:
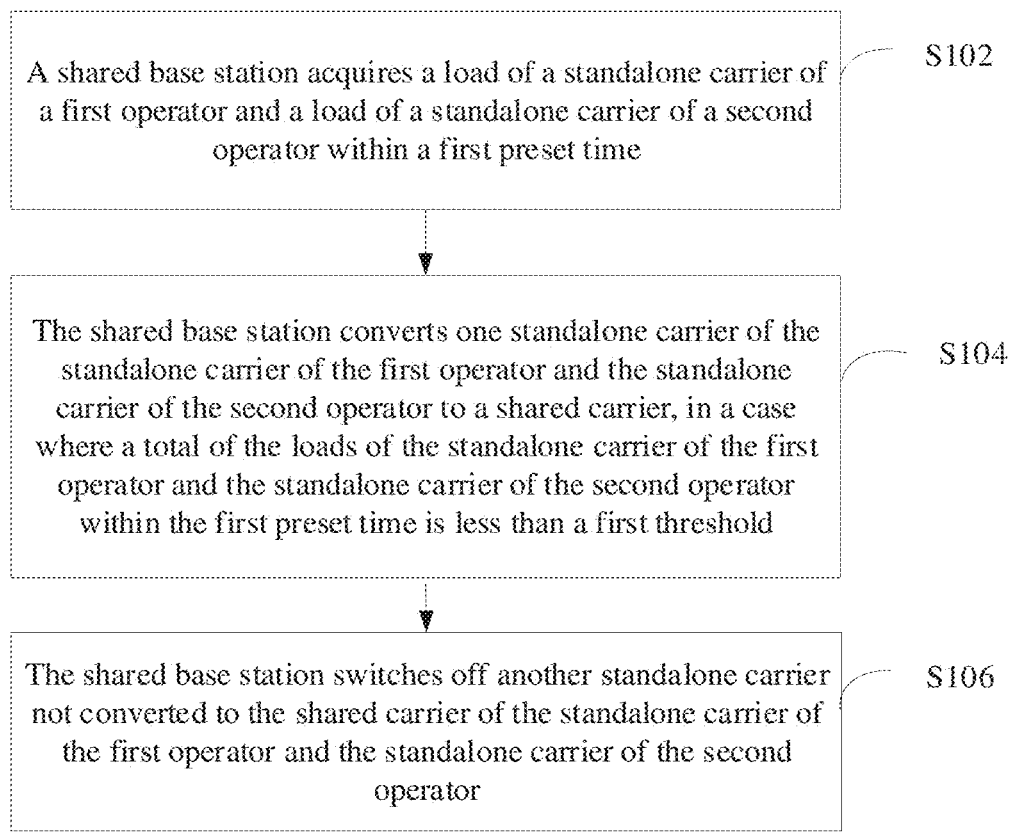
FIG. 1 shows a schematic flow diagram of a control method for a sharing mode of a base station according to some embodiments of the present disclosure.

FIG. 1 is a flow diagram of a control method for a sharing mode of a base station according to some embodiments of the present disclosure. As shown in FIG. 1, the method of this embodiment comprises: steps S102 to S106.

In the step S102, a shared base station acquires a load of a standalone carrier of a first operator and a load of a standalone carrier of a second operator within a first preset time.

The shared base station can configure the standalone carrier of the first operator and the standalone carrier of the second operator, respectively. A terminal of the first operator accesses the standalone carrier of the first operator, and correspondingly, a terminal of the second operator accesses the standalone carrier of the second operator. For example, the load comprises: a number of calls, a throughput, or a number of Radio Resource Control (RRC) connections.

In the step S104, the shared base station converts one standalone carrier of the standalone carrier of the first operator and the standalone carrier of the second operator to a shared carrier, in a case where a total of the loads of the standalone carrier of the first operator and the standalone carrier of the second operator within the first preset time is less than a first threshold. The skilled person in the art can understand that converting a standalone carrier to a shared carrier means reconfiguring the standalone carrier as the share carrier.

The first threshold can be determined according to a maximum load of the shared carrier after the converting. The shared base station can randomly select one standalone carrier of the standalone carrier of the first operator and the second operator to be converted to the shared carrier, or always select the standalone carrier of the first operator to be converted to the shared carrier, or always select the standalone carrier of the second operator to be converted to the shared carrier.

In some embodiments, the shared base station converts the standalone carrier of the first operator to the shared carrier, in a case where the load of the standalone carrier of the first operator is greater than that of the standalone carrier of the second operator; and the shared base station converts the standalone carrier of the second operator to the shared carrier, in a case where the load of the standalone carrier of the first operator is less than that of the standalone carrier of the second operator. Namely, the shared base station can select a standalone carrier with a greater load to be converted to the shared carrier, so as to reduce the number of times of handing over the terminal and save signaling resources. The shared base station randomly select one standalone carrier of the standalone carrier of the first operator and the second operator to be converted to the shared carrier, in a case where the load of the standalone carrier of the first operator is equal to that of the standalone carrier of the second operator.

In the step S106, the shared base station switches off another standalone carrier not converted to the shared carrier of the standalone carrier of the first operator and the standalone carrier of the second operator.

For example, the shared base station switches off the standalone carrier of the second operator in a case where the standalone carrier of the first operator is converted to the shared carrier, and switches off the standalone carrier of the first operator in a case where the standalone carrier of the second operator is converted to the shared carrier. In a case where the shared base station switches off part of the carriers, the number of transmissions of the carriers is reduced, energy consumption is reduced and resources are saved.

In some embodiments, the shared base station sends a first handover instruction to a terminal, in a case where the another standalone carrier not converted to the shared carrier is accessed by the terminal, wherein the first handover instruction comprises a frequency band corresponding to the shared carrier; and the shared base station switches off another standalone carrier not converted to the shared carrier in a case where the terminal is handed over to the shared carrier. Before the standalone carrier is switched off, it is needed to handover the terminal connected on the another standalone carrier not converted to the shared carrier to the shared carrier. For a terminal in an IDLE state, after the another standalone carrier not converted to the shared carrier is switched off, the terminal in the IDLE state will perform a cell reselection to reconnect to the shared base station. If the number of terminals accessing a standalone carrier to be switched off (i.e., the another standalone carrier not converted to the shared carrier) is less, a preset time can be waited for, and if the terminals stop services within the preset time, the standalone carrier to be switched off is directly switched off, otherwise, the terminal accessing the standalone carrier to be switched off is handed over to the shared carrier, and then the standalone carrier to be switched off is switched off.

In some embodiments, in a case where the terminal of the first operator and the terminal of the second operator are both connected with the shared base station through the shared carrier, the shared base station sends information of the terminal of the first operator to a core network of the first operator and sends information of the terminal of the second operator to a core network of the second operator, according to a PLMN (Public Land Mobile Network) identity of each terminal accessing the shared carrier.

The above embodiments provide that the shared base station can convert between different modes of being configured with the standalone carriers and the shared carrier. The shared base station determines whether to convert the standalone carrier of the first operator or the standalone carrier of the another second operator to the shared carrier and switch off the another standalone carrier not switched to the shared carrier, by judging the load of the standalone carrier of the first operator and the load of the standalone carrier of the second operator within the first preset time. Therefore, the shared base station can reduce the number of the carriers under the condition of less load, and at the same time, can further provide services for the terminals of different operators using the shared carrier, which ensures the services for the terminals while reducing energy consumption, saving resources and improving resource utilization.

Other embodiments of the control method for a sharing mode of a base station of the present disclosure are described below with reference to FIG. 2.

Figure 2:
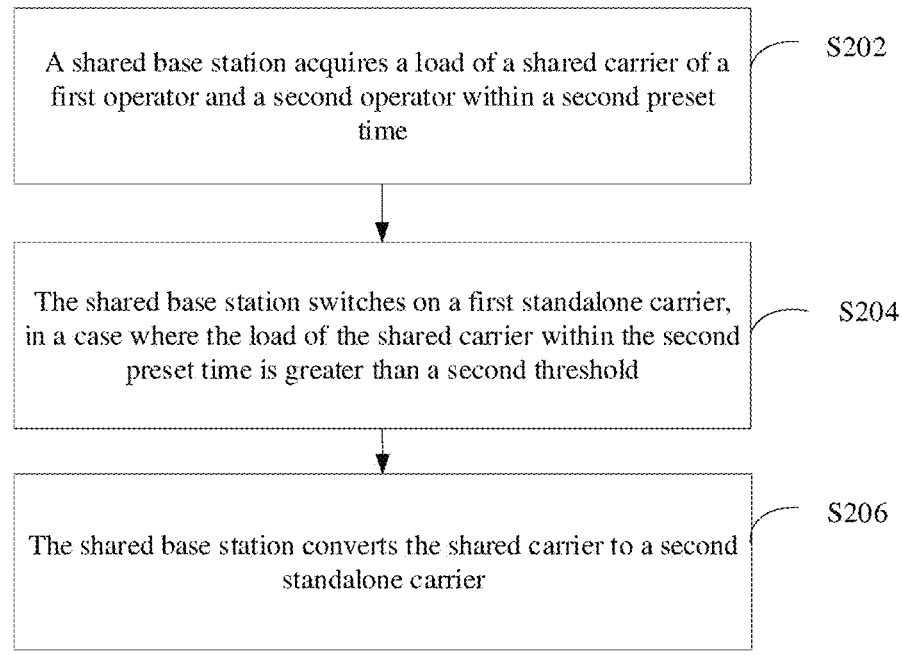
FIG. 2 shows a schematic flow diagram of a control method for a sharing mode of a base station according to other embodiments of the present disclosure.

FIG. 2 is a flow diagram of a control method for a sharing mode of a base station according to other embodiments of the present disclosure. As shown in FIG. 2, the method of this embodiment comprises: steps S202 to S206.

In the step S202, a shared base station acquires a load of a shared carrier of a first operator and a second operator within a second preset time.

The shared base station can configure the shared carrier of the first operator and the second operator, and terminals of the first operator and terminals of the second operator both access the shared carrier. The shared carrier can be the shared carrier to which the standalone carrier of the first operator or the standalone carrier of the second operator is converted in the foregoing embodiment.

In the step S204, the shared base station switches on a first standalone carrier, in a case where the load of the shared carrier within the second preset time is greater than a second threshold.

The first threshold is less than or equal to the second threshold. The shared base station can switch on the standalone carrier which is previously switched-off as the first standalone carrier. Or the shared base station can determine that the first standalone carrier is used as a standalone carrier of the first operator or the second operator, according to a frequency band corresponding to each operator and a frequency band corresponding to the first standalone carrier. For example, if the frequency band corresponding to the first standalone carrier belongs to a frequency band supported by the first operator, the first standalone carrier is used as the standalone carrier of the first operator, and likewise, if the frequency band corresponding to the first standalone carrier belongs to a frequency band supported by the second operator, the first standalone carrier is used as the standalone carrier of the second operator.

In the step S206, the shared base station converts the shared carrier to a second standalone carrier.

The second standalone carrier and the first standalone carrier are respectively used as standalone carriers of different operators. In addition to the method of determining the operators corresponding to the first standalone carrier and the second standalone carrier in the foregoing embodiments, in some embodiments, the first standalone carrier is used as the standalone carrier of the second operator and the second standalone carrier is used as the standalone carrier of the first operator, in a case where the load of the first operator is greater than that of the second operator on the shared carrier, and the first standalone carrier is used as the standalone carrier of the first operator and the second standalone carrier is used as the standalone carrier of the second operator, in a case where the load of the first operator is less than that of the second operator on the shared carrier. That is, the shared base station can select an operator with a less load as an operator corresponding to the first standalone carrier which is newly switched-on, which can reduce a number of times of handing over terminals, and save signaling resources.

In some embodiments, the shared base station sends a second handover instruction to a terminal of an operator corresponding to the first standalone carrier, in a case where the shared carrier is accessed by the terminal of the operator corresponding to the first standalone carrier, wherein the second handover instruction comprises a frequency band corresponding to the first standalone carrier; and the shared base station switches the shared carrier to the second standalone carrier, in a case where the terminal of the operator corresponding to the first standalone carrier is handed over to the first standalone carrier. After the first standalone carrier is switched on, a terminal in a connected state of the operator corresponding to the first standalone carrier on the original shared carrier can be switched to the first standalone carrier. A terminal in an IDLE state may not be subjected to such processing.

In some embodiments, the shared base station sends information of a terminal accessing the first standalone carrier to a core network of an operator corresponding to the first standalone carrier, and sends information of a terminal accessing the second standalone carrier to a core network of an operator corresponding to the second standalone carrier.

In the method of the above embodiment, since the standalone carrier and the shared carrier are both configured on the RAN side, the base station can directly perform converting between the standalone carriers and the shared carrier in a manner of software configuration. Considering that loads of base stations in some regions have a tidal effect, a converting strategy of the sharing mode of the base station is provided, which can effectively utilize network resources on a premise of ensuring respective services of the operators, and effectively reduce energy consumption of the co-constructed and shared base stations.

The present disclosure further provides a shared base station, which is described below with reference to FIG. 3.

Figure 3:
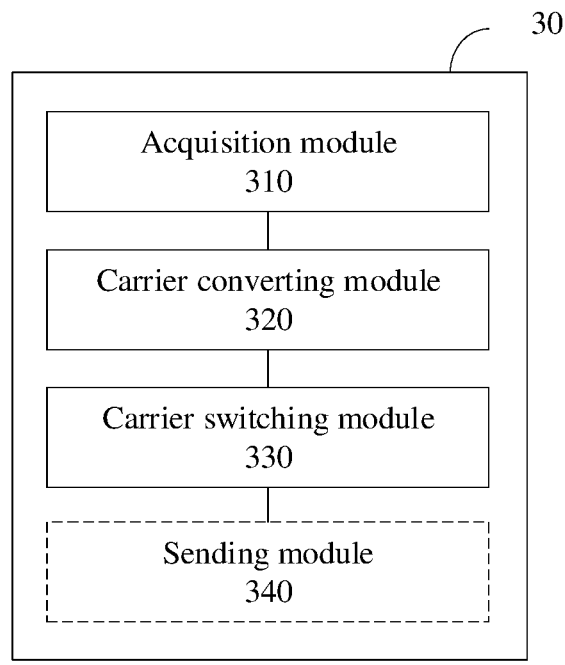
FIG. 3 shows a schematic structural diagram of a shared base station according to some embodiments of the present disclosure.

FIG. 3 is a structural diagram of a shared base station according to some embodiments of the present disclosure. As shown in FIG. 3, the shared base station 30 of this embodiment comprises: an acquisition module 310, a carrier converting module 320, and a carrier switching module 330. The skilled person in the art can understand that the acquisition module 310, the carrier converting module 320, and the carrier switching module 330 can be realized by a processer in the shared station.

The acquisition module 310 is configured to acquire a load of a standalone carrier of a first operator and a load of a standalone carrier of a second operator within a first preset time.

The carrier converting module 320 is configured to convert one standalone carrier of the standalone carrier of the first operator and the standalone carrier of the second operator to a shared carrier, in a case where a total of the loads of the standalone carrier of the first operator and the standalone carrier of the second operator within the first preset time is less than a first threshold.

In some embodiments, the carrier converting module 320 is configured to convert the standalone carrier of the first operator to the shared carrier, in a case where the load of the standalone carrier of the first operator is greater than that of the standalone carrier of the second operator; and; and convert the standalone carrier of the second operator to the shared carrier, in a case where the load of the standalone carrier of the first operator is less than that of the standalone carrier of the second operator.

The carrier switching module 330 is configured to switch off another standalone carrier not converted to the shared carrier of the standalone carrier of the first operator and the standalone carrier of the second operator.

In some embodiments, the base station 30 further comprises: a sending module 340. The sending module 340 is configured to send a first handover instruction to a terminal, in a case where the standalone carrier not switched to the shared carrier is accessed by the terminal, wherein the first handover instruction comprises a frequency band corresponding to the shared carrier, and the carrier switching module 330 is configured to switch off the another standalone carrier not converted to the shared carrier, in a case where the terminal is handed over. The skilled person in the art can understand that the sending module 340 can be realized by a transmitter in the shared base station.

In some embodiments, the sending module 340 is configured to send information of a terminal of the first operator accessing the shared carrier to a core network of the first operator and sending information of a terminal of the second operator accessing the shared carrier to a core network of the second operator, according to a Public Land Mobile Network (PLMN) identity of each terminal accessing the shared carrier. Correspondingly, the shared base station 30 can further comprise: a receiving module configured to receive information sent by the core network of the first operator to send the information to the terminal of the first operator through the shared carrier, and receive information sent by the core network of the second operator to send the information to the terminal of the second operator through the shared carrier. The skilled person in the art can understand that the receiving module can be realized by a receiver in the shared base station.

In some embodiments, the acquisition module 310 is further configured to acquire a load of the shared carrier within a second preset time; the carrier switching module 330 is further configured to switch on a first standalone carrier, in a case where the load of the shared carrier within the second preset time is greater than a second threshold, wherein the first threshold is less than or equal to the second threshold; and the carrier converting module 320 is further configured to convert the shared carrier to a second standalone carrier, wherein the first standalone carrier and the second standalone carrier are respectively used as standalone carriers of different operators.

In some embodiments, the carrier converting module 320 is further configured to use the first standalone carrier as the standalone carrier of the second operator, and use the second standalone carrier as the standalone carrier of the first operator, in a case where the load of the first operator is greater than that of the second operator on the shared carrier; and use the first standalone carrier as the standalone carrier of the first operator, and use the second standalone carrier as the standalone carrier of the second operator in a case where the load of the first operator is less than that of the second operator on the shared carrier.

In some embodiments, the sending module 340 is further configured to send a second handover instruction to a terminal of an operator corresponding to the first standalone carrier, in a case where the shared carrier is accessed by the terminal of the operator corresponding to the first standalone carrier, and the carrier converting module 320 is further configured to convert the shared carrier to the second standalone carrier, in a case where the terminal of the operator corresponding to the first standalone carrier is handed over to the first standalone carrier, wherein the second handover instruction comprises a frequency band corresponding to the first standalone carrier.

In some embodiments, the sending module 340 is further configured to send information of a terminal accessing the first standalone carrier to a core network of an operator corresponding to the first standalone carrier, and send information of a terminal accessing the second standalone carrier to a core network of an operator corresponding to the second standalone carrier. The receiving module is further configured to receive information sent by the core network of the first operator to send the information to the terminal of the first operator through the first standalone carrier, and receive information sent by the core network of the second operator to send the information to the terminal of the second operator through the second standalone carrier. The receiving module is further configured to receive information from the terminal.

The shared base station in the embodiments of the present disclosure can be implemented by various computing devices or computer systems, which are described below with reference to FIGS. 4 and 5.

Figure 4:
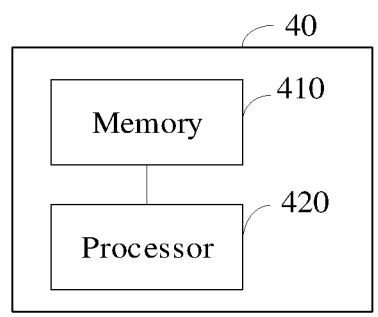
FIG. 4 shows a schematic structural diagram of a shared base station according to other embodiments of the present disclosure.

FIG. 4 is a structural diagram of a shared base station according to some embodiments of the present disclosure. As shown in FIG. 4, an apparatus 40 of this embodiment comprises: a memory 410 and a processor 420 coupled to the memory 410, the processor 420 being configured to perform, based on instructions stored in the memory 410, the control method for a sharing mode of a base station in any of the embodiments of the present disclosure. The skilled person in the art can understand that sending or receiving steps in the control method for a sharing mode of a base station in any of the embodiments of the present disclosure can be performed by the processor in conjunction with the transmitter or the receiver.

The memory 410 can include, for example, a system memory, fixed non-volatile storage medium, and the like. The system memory has thereon stored, for example, an operating system, an application program, a boot loader, a database, other programs, and the like.

Figure 5:
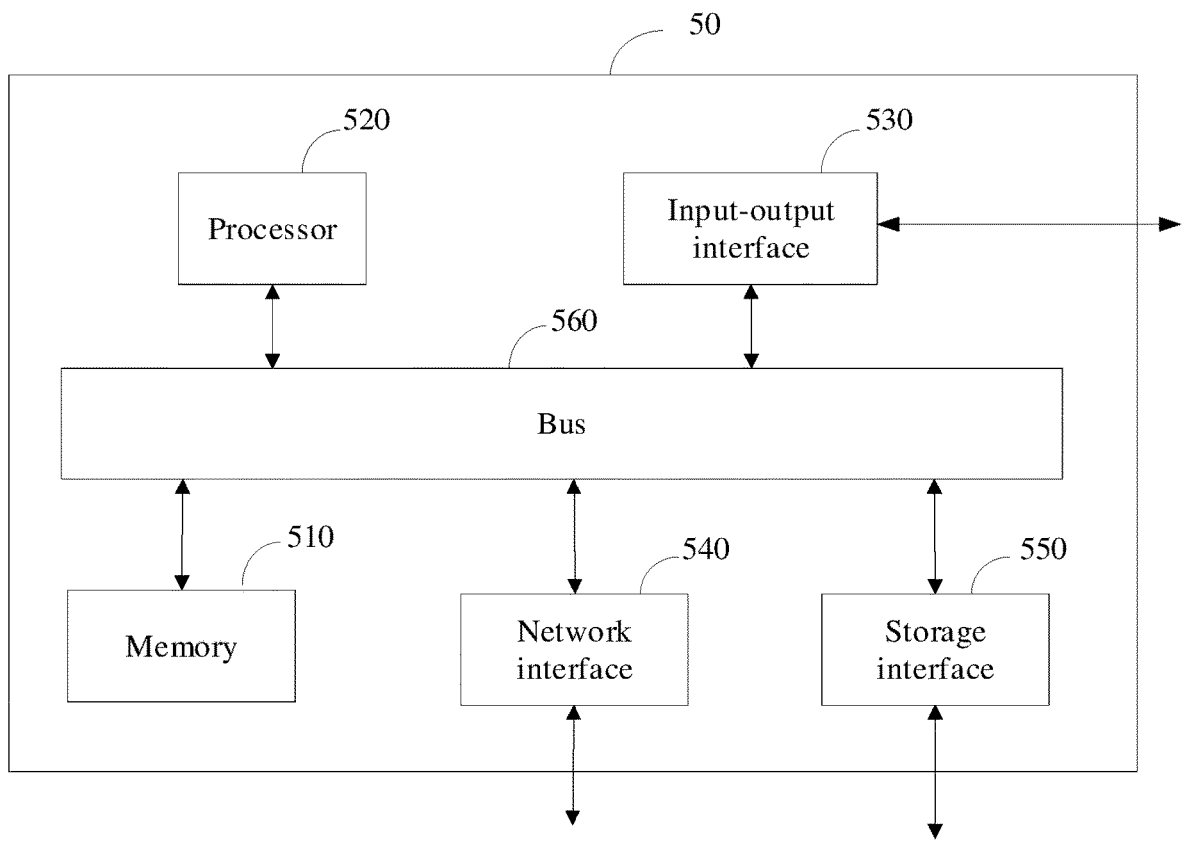
FIG. 5 shows a schematic structural diagram of a shared base station according to still other embodiments of the present disclosure.

FIG. 5 is a structural diagram of a shared base station according to other embodiments of the present disclosure. As shown in FIG. 5, an apparatus 50 of this embodiment comprises: a memory 510 and a processor 520, which are similar to the memory 410 and the processor 420, respectively. An input/output interface 530, network interface 540, storage interface 550, etc. can further be comprised. These interfaces 530, 540, 550 and the memory 510 can be connected with the processor 520, for example, through a bus 560. The input/output interface 530 provides a connection interface for input/output devices such as a display, a mouse, a keyboard, and a touch screen. The network interface 540 provides a connection interface for various networking devices, such as a database server or a cloud storage server. The storage interface 550 provides a connection interface for external storage devices such as an SD card and a USB flash disk.

The present disclosure further provides a communication system, which is described below with reference to FIG. 6.

Figure 6:
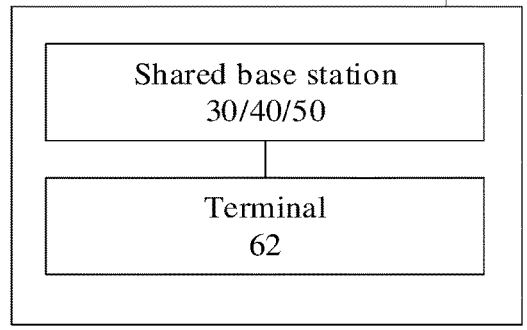
FIG. 6 shows a schematic structural diagram of a communication system according to some embodiments of the present disclosure.

FIG. 6 is a structural diagram of a communication system according to some embodiments of the present disclosure. As shown in FIG. 6, a communication system 6 of this embodiment comprises: the shared base station 30/40/50 of any of the foregoing embodiments; and a terminal 62.

The terminal 62 is configured to receive a first handover instruction sent by the shared base station 30/40/50 under the condition of being linked with a standalone carrier not switched to a shared carrier, and be switched to the shared carrier according to the first handover instruction, wherein the first handover instruction comprises a frequency band corresponding to the shared carrier.

In some embodiments, the terminal 62 is further configured to receive a second handover instruction sent by the shared base station 30/40/50 under the condition of being a terminal of an operator corresponding to the first standalone carrier, and be switched to the first standalone carrier according to the second handover instruction, wherein the second handover instruction comprises a frequency band corresponding to the first standalone carrier.

As will be appreciated by those skilled in the art, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more computer-available non-transitory storage media (including, but not limited to, a disk memory, CD-ROM, optical memory, and the like) having computer-available program code embodied therein.

The present disclosure is described with reference to flow diagrams and/or block diagrams of the method, device (system), and computer program product according to the embodiments of the present disclosure. It will be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing functions specified in one or more flows of the flow diagrams and/or one or more blocks of the block diagrams.

These computer program instructions can also be stored in a computer-readable memory that can guide a computer or other programmable data processing devices to work in a specific manner, such that the instructions, which are stored in the computer-readable memory, produce an article of manufacture including instruction means which implement functions specified in one or more flows of the flow diagrams and/or one or more blocks of the block diagrams.

These computer program instructions can also be loaded onto a computer or other programmable data processing devices to cause a series of operation steps to be performed on the computer or other programmable devices to produce a computer-implemented process such that the instructions, which are executed on the computer or other programmable devices, provide steps configured to implement functions specified in one or more flows of the flow diagrams and/or one or more blocks of the block diagrams.

The above content is only the preferred embodiments of the present disclosure and not used for limiting the present disclosure, and any modification, equivalent replacement, improvement and the like made within the spirit and principle of the present disclosure shall be included in the scope of protection of the present disclosure.

What is claimed is:

1. A control method for a sharing mode of a base station, performed by a shared base station, comprising:
   acquiring a load of a standalone carrier of a first operator and a load of a standalone carrier of a second operator within a first preset time;
   converting one standalone carrier of the standalone carrier of the first operator and the standalone carrier of the second operator to a shared carrier, in a case where a total of the loads of the standalone carrier of the first operator and the standalone carrier of the second operator within the first preset time is less than a first threshold; and
   switching off another standalone carrier not converted to the shared carrier of the standalone carrier of the first operator and the standalone carrier of the second operator.

2. The control method according to claim 1, wherein converting one standalone carrier of the standalone carrier of the first operator and the standalone carrier of the second operator to a shared carrier comprises:
   converting the standalone carrier of the first operator to the shared carrier, in a case where the load of the standalone carrier of the first operator is greater than that of the standalone carrier of the second operator; and
   converting the standalone carrier of the second operator to the shared carrier, in a case where the load of the standalone carrier of the first operator is less than that of the standalone carrier of the second operator.

3. The control method according to claim 1, wherein switching off another standalone carrier not converted to the shared carrier of the standalone carrier of the first operator and the standalone carrier of the second operator comprises:
   sending a first handover instruction to a terminal, in a case where the another standalone carrier not converted to the shared carrier is accessed by the terminal, wherein the first handover instruction comprises a frequency band corresponding to the shared carrier; and
   switching off the another standalone carrier not converted to the shared carrier, in a case where the terminal is handed over to the shared carrier.

4. The control method according to claim 1, further comprising:
   sending information of a terminal of the first operator accessing the shared carrier to a core network of the first operator and sending information of a terminal of the second operator accessing the shared carrier to a core network of the second operator, according to a Public Land Mobile Network (PLMN) identity of each terminal accessing the shared carrier.

5. The control method according to claim 1, further comprising:
acquiring a load of the shared carrier within a second preset time;
switching on a first standalone carrier, in a case where the load of the shared carrier within the second preset time is greater than a second threshold, wherein the first threshold is less than or equal to the second threshold; and
converting the shared carrier to a second standalone carrier, wherein the first standalone carrier and the second standalone carrier are respectively used as standalone carriers of different operators.

6. The control method according to claim 5, wherein:
the first standalone carrier is used as the standalone carrier of the second operator and the second standalone carrier is used as the standalone carrier of the first operator, in a case where the load of the first operator is greater than that of the second operator on the shared carrier; and
the first standalone carrier is used as the standalone carrier of the first operator and the second standalone carrier is used as the standalone carrier of the second operator, in a case where the load of the first operator is less than that of the second operator on the shared carrier.

7. The control method according to claim 5, wherein converting the shared carrier to the second standalone carrier comprises:
sending a second handover instruction to a terminal of an operator corresponding to the first standalone carrier, in a case where the shared carrier is accessed by the terminal of the operator corresponding to the first standalone carrier, wherein the second handover instruction comprises a frequency band corresponding to the first standalone carrier; and
converting the shared carrier to the second standalone carrier, in a case where the terminal of the operator corresponding to the first standalone carrier is handed over to the first standalone carrier.

8. The control method according to claim 5, further comprising:
sending information of a terminal accessing the first standalone carrier to a core network of an operator corresponding to the first standalone carrier, and sending information of a terminal accessing the second standalone carrier to a core network of an operator corresponding to the second standalone carrier.

9. The control method according to any of claim 1, wherein the load comprises: a number of calls, a throughput, or a number of Radio Resource Control (RRC) connections.

10. A shared base station, comprising:
an acquisition module configured to acquire a load of a standalone carrier of a first operator and a load of a standalone carrier of a second operator within a first preset time;
a carrier converting module configured to convert one standalone carrier of the standalone carrier of the first operator and the standalone carrier of the second operator to a shared carrier, in a case where a total of the loads of the standalone carrier of the first operator and the standalone carrier of the second operator within the first preset time is less than a first threshold; and
a carrier switching module configured to switch off another standalone carrier not converted to the shared carrier of the standalone carrier of the first operator and the standalone carrier of the second operator.

11. The shared base station according to claim 10, wherein:
the acquisition module is further configured to acquire a load of the shared carrier within a second preset time;
the carrier switching module is further configured to switch on a first standalone carrier, in a case where the load of the shared carrier within the second preset time is greater than a second threshold, wherein the first threshold is less than or equal to the second threshold; and
the carrier converting module is further configured to convert the shared carrier to a second standalone carrier, wherein the first standalone carrier and the second standalone carrier are respectively used as standalone carriers of different operators.

12. A shared base station, comprising:
a processor; and
a memory coupled to the processor for storing instructions which, when executed by the processor, cause the processor to perform the control method for a sharing mode of a base station according to claim 1.

13. A non-transitory computer-readable storage medium having thereon stored a computer program which, when executed by a processor, implements the steps of the method according to claim 1.

14. A communication system, comprising: the shared base station according to claim 10; and
a terminal configured to receive a first handover instruction sent by the shared base station and handover to the shared carrier according to the first handover instruction, in a case where the terminal accesses the another standalone carrier not converted to the shared carrier, wherein the first handover instruction comprises a frequency band corresponding to the shared carrier.

15. The communication system according to claim 14, wherein:
the shared base station is further configured to acquire a load of the shared carrier within a second preset time, switch on a first standalone carrier, in a case where the load of the shared carrier within the second preset time is greater than a second threshold, wherein the first threshold is less than or equal to the second threshold and switch the shared carrier to a second standalone carrier, wherein the first standalone carrier and the second standalone carrier are respectively used as standalone carriers of different operators; and
the terminal is further configured to receive a second handover instruction sent by the shared base station and handover to the first standalone carrier according to the second handover instruction, in a case that the terminal is a terminal of an operator corresponding to the first standalone carrier, wherein the second handover instruction comprises a frequency band corresponding to the first standalone carrier.

16. The shared base station according to claim 10, wherein the carrier converting module is configured to convert the standalone carrier of the first operator to the shared carrier, in a case where the load of the standalone carrier of the first operator is greater than that of the standalone carrier of the second operator, and convert the standalone carrier of the second operator to the shared carrier, in a case where the load of the standalone carrier of the first operator is less than that of the standalone carrier of the second operator.

17. The shared base station according to claim 10, further comprising: a sending module, wherein:

the sending module is configured to send a first handover instruction to a terminal, in a case where the standalone carrier not switched to the shared carrier is accessed by the terminal, wherein the first handover instruction comprises a frequency band corresponding to the shared carrier; and the carrier switching module is further configured to switch off the another standalone carrier not converted to the shared carrier, in a case where the terminal is handed over.

18. The shared base station according to claim 10, further comprising:

a sending module configured to send information of a terminal of the first operator accessing the shared carrier to a core network of the first operator and sending information of a terminal of the second operator accessing the shared carrier to a core network of the second operator, according to a Public Land Mobile Network (PLMN) identity of each terminal accessing the shared carrier.

19. The shared base station according to claim 11, wherein:

the first standalone carrier is used as the standalone carrier of the second operator and the second standalone carrier is used as the standalone carrier of the first operator, in a case where the load of the first operator is greater than that of the second operator on the shared carrier, and the first standalone carrier is used as the standalone carrier of the first operator and the second standalone carrier is used as the standalone carrier of the second operator, in a case where the load of the first operator is less than that of the second operator on the shared carrier;

the shared base station further comprises: a sending module, wherein the sending module is configured to send a second handover instruction to a terminal of an operator corresponding to the first standalone carrier, in a case where the shared carrier is accessed by the terminal of the operator corresponding to the first standalone carrier, and the carrier converting module is further configured to convert the shared carrier to the second standalone carrier, in a case where the terminal of the operator corresponding to the first standalone carrier is handed over to the first standalone carrier, wherein the second handover instruction comprises a frequency band corresponding to the first standalone carrier; and/or the sending module configured to send information of a terminal accessing the first standalone carrier to a core network of an operator corresponding to the first standalone carrier, and send information of a terminal accessing the second standalone carrier to a core network of an operator corresponding to the second standalone carrier.

20. The shared base station according to claim 12, wherein the memory further stores instructions which, when executed by the processor, cause the processor to:

acquire a load of the shared carrier within a second preset time;

switch on a first standalone carrier, in a case where the load of the shared carrier within the second preset time is greater than a second threshold, wherein the first threshold is less than or equal to the second threshold; and convert the shared carrier to a second standalone carrier, wherein the first standalone carrier and the second standalone carrier are respectively used as standalone carriers of different operators.

* * * * *